Sept. 1, 1936.  B. C. CARTER  2,053,180
COUPLING FOR CONVEYING ROTARY MOTION
Original Filed March 16, 1931  7 Sheets-Sheet 1
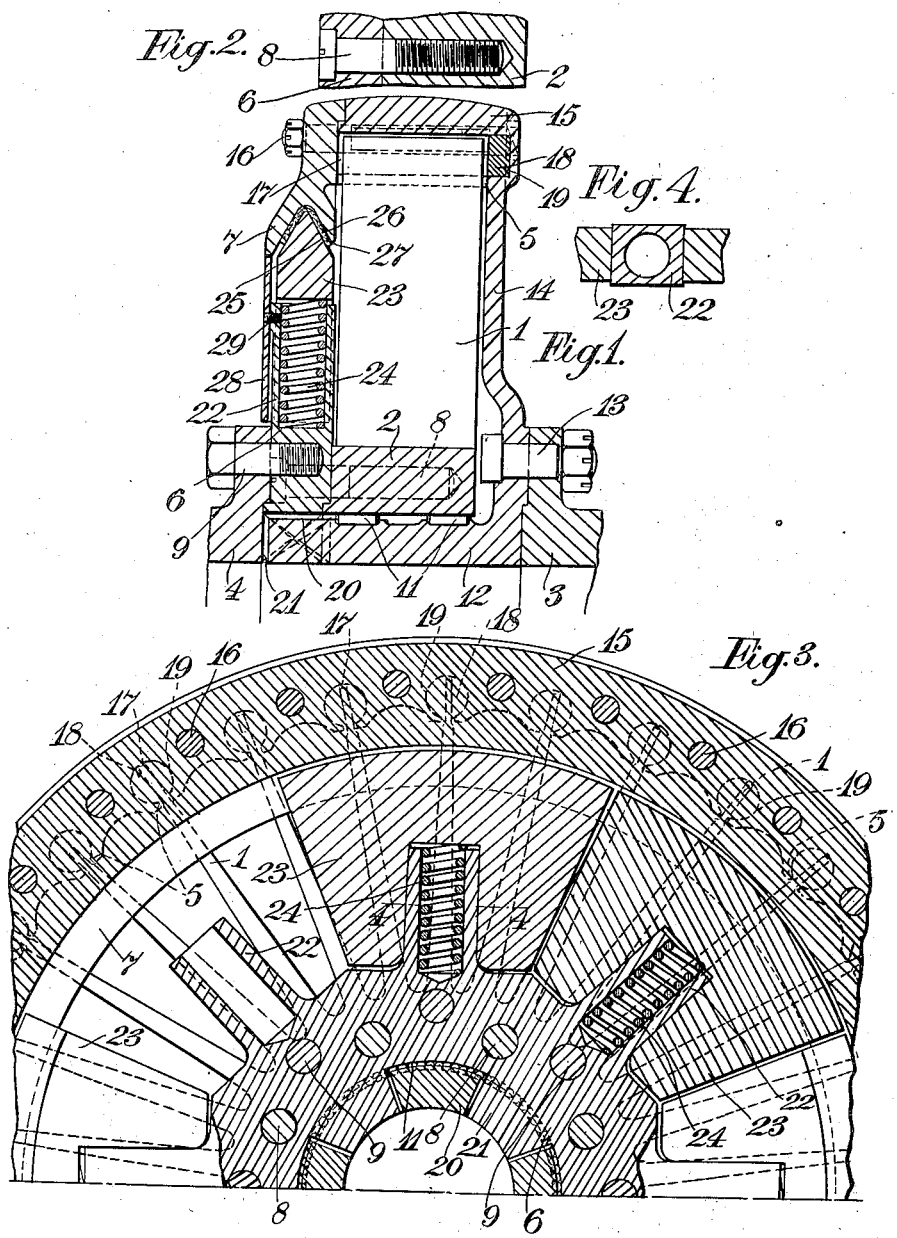

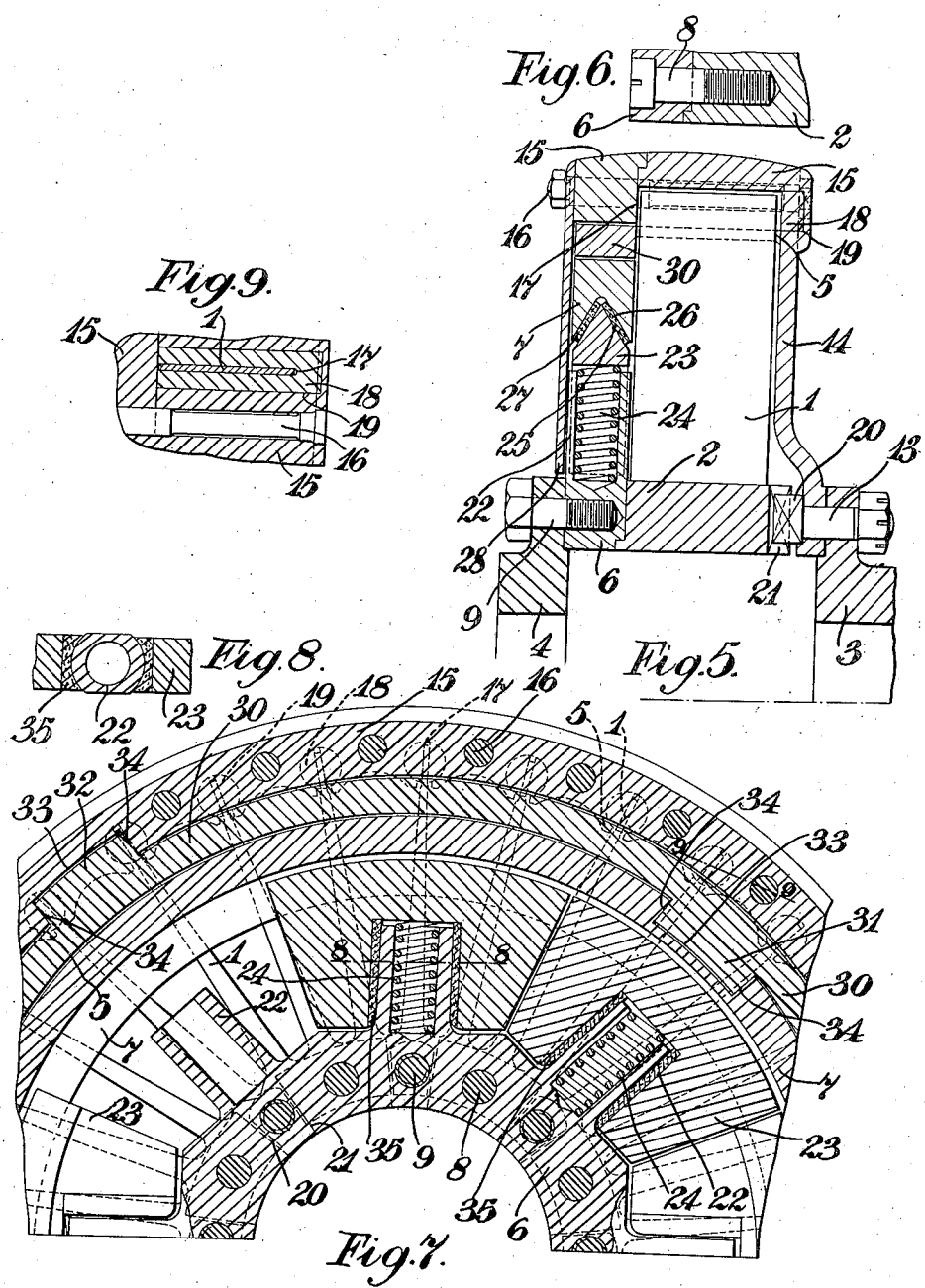

Sept. 1, 1936.   B. C. CARTER   2,053,180
COUPLING FOR CONVEYING ROTARY MOTION
Original Filed March 16, 1931   7 Sheets-Sheet 3

B. C. Carter
INVENTOR

By: Marks & Clerk
ATTYS.

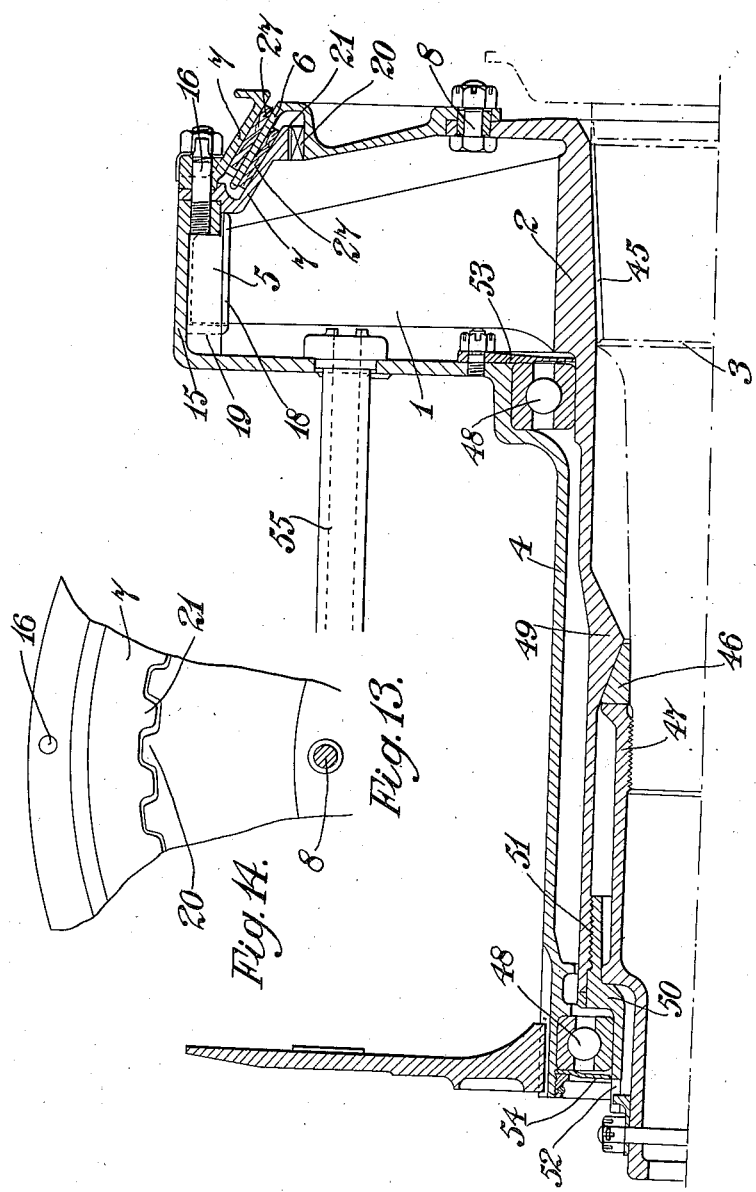

Sept. 1, 1936.  B. C. CARTER  2,053,180
COUPLING FOR CONVEYING ROTARY MOTION
Original Filed March 16, 1931   7 Sheets-Sheet 5
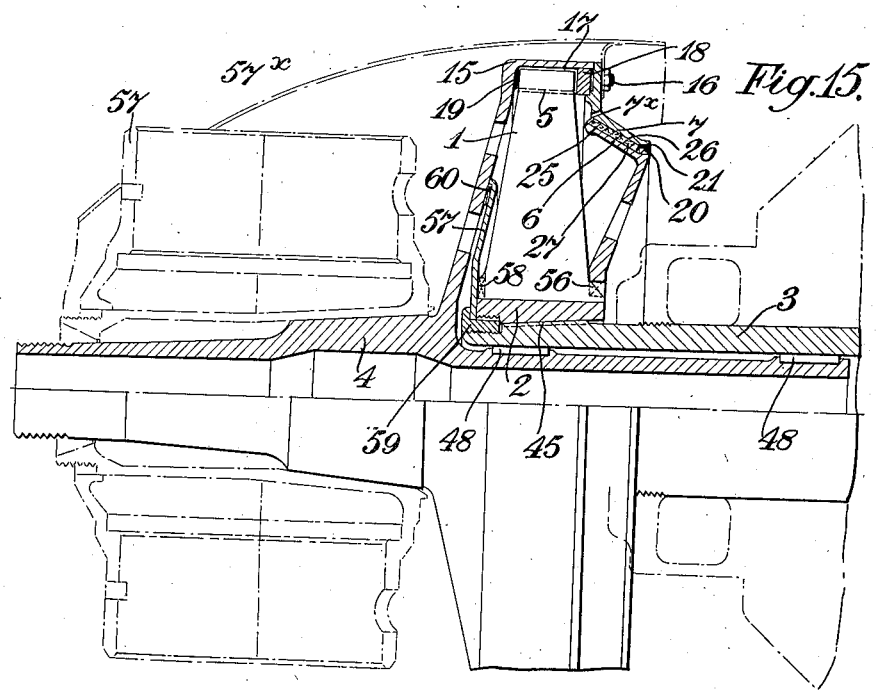
B. C. Carter
INVENTOR

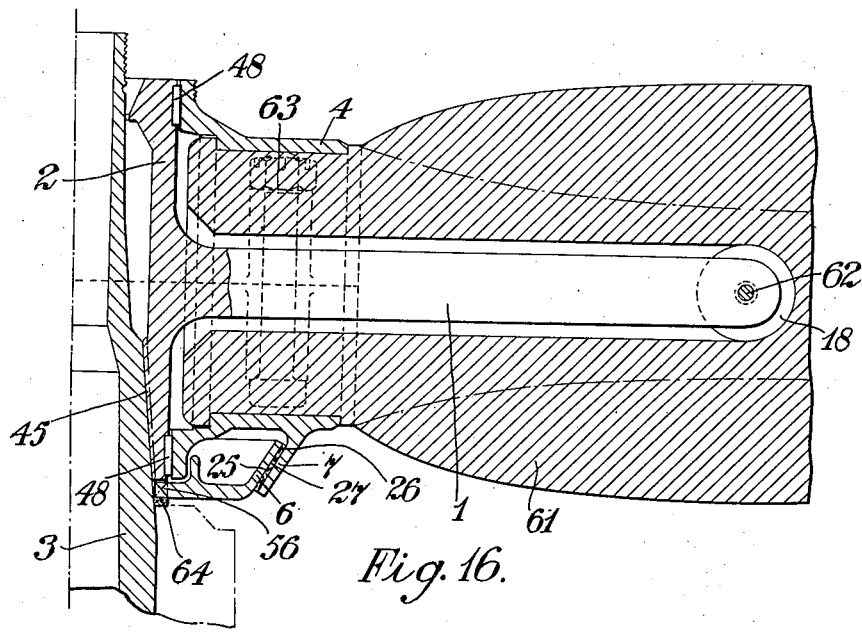
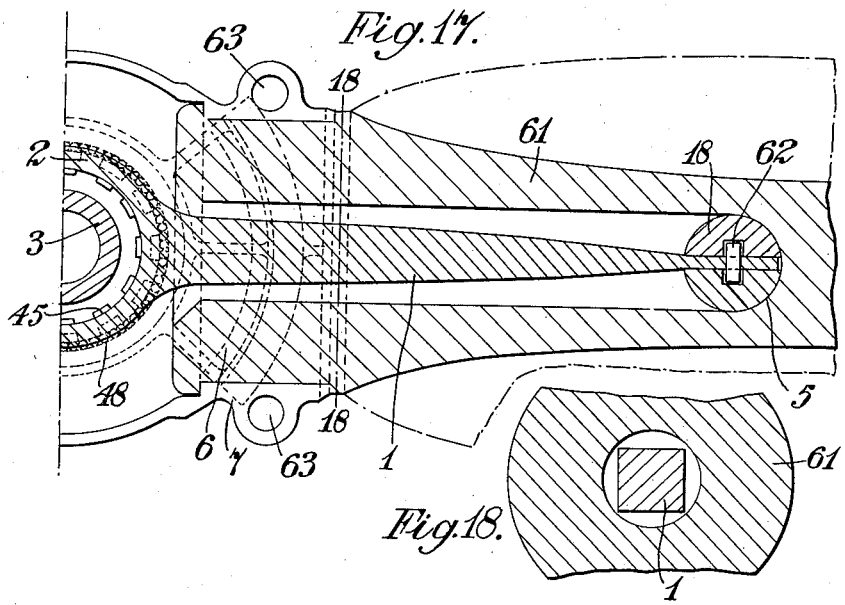

Sept. 1, 1936.         B. C. CARTER         2,053,180
COUPLING FOR CONVEYING ROTARY MOTION
Original Filed March 16, 1931    7 Sheets-Sheet 7
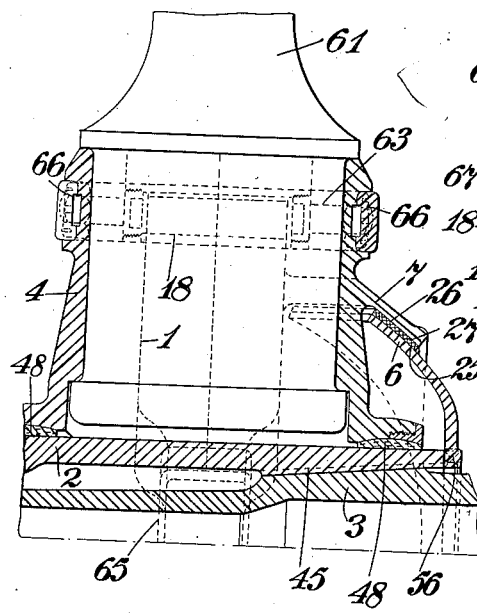
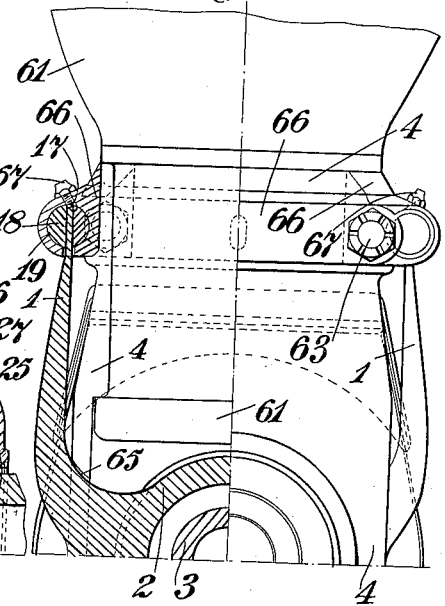
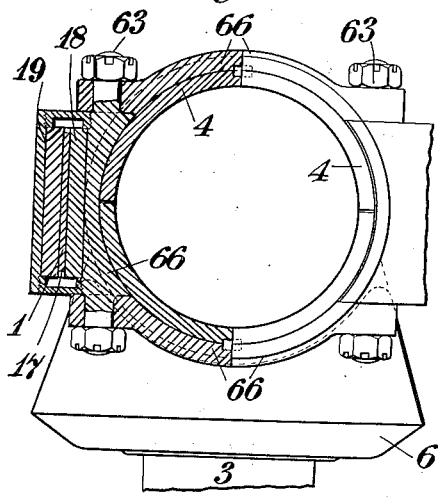

Patented Sept. 1, 1936

2,053,180

UNITED STATES PATENT OFFICE 2,053,180

COUPLING FOR CONVEYING ROTARY MOTION

Benjamin Charles Carter, South Farnborough, England

Application March 16, 1931, Serial No. 523,117
Renewed July 14, 1936. In Great Britain
March 17, 1930

10 Claims. (Cl. 64—30)

This invention relates to improvements in gearing and more particularly to couplings for conveying rotary motion.

If a spring coupling of suitable flexibility is inserted in an engine-airscrew drive for example, the speed at which a natural frequency of torsional vibration of the crankshaft-airscrew system is equal to the frequency of the engine explosion impulses may be reduced to a value substantially below the normal or cruising speed of the aircraft, but in such an arrangement torsional vibration may occur when passing through the reduced speed and at other resonance peaks.

If a friction clutch, per se, were employed in an engine-airscrew drive, the engine would be liable to race and the clutch would be liable to become overheated.

The present invention has for its chief object to avoid or reduce harmful torsional vibration at any speed without liability of overheating of the parts.

According to one feature of the present invention, a coupling for conveying rotary motion between driving and driven members comprises resilient means or a spring device of suitable flexibility for lowering a natural frequency of torsional vibration of the system of driving and driven members, and a solid friction, hydraulic or the like damper (hereinafter generally referred to as a friction damper), the spring device and the friction damper being arranged in parallel between the driving and the driven members.

According to another feature of the present invention, a coupling for conveying rotary motion is constructed as a unit having parts adapted to be attached to the driving and driven members respectively, and comprises metal driving springs for transmitting the drive between the said parts, and a friction damper for preventing or reducing relative oscillation of the said parts. The damper may transmit part of the drive.

According to another feature of the present invention, the coupling is constructed or arranged in such a manner that the friction torque or damping action of the friction damper is varied by the thrust resulting from the rotation of the driven member, for example, an airscrew, in one or either direction.

According to another feature of the present invention, the coupling is constructed or arranged in such a manner that the friction torque or damping action of the friction damper is varied by centrifugal action resulting from the rotation of the coupling.

According to another feature of the present invention, the coupling is constructed or arranged in such a manner that slight axial, radial or universal movement can take place between the driving and driven members.

In one arrangement according to the present invention as applied to a crankshaft-airscrew (or other) drive, the crankshaft (or driving member) drives the airscrew (or driven member) through a series of spring arms. The spring arms radiate from one of their ends from a boss or part fast on the driving or driven member, and the outer or other ends of the spring arms movably engage abutments on the driven or the driving member respectively. For example, the spring arms may radiate from a boss or part fast on a crankshaft, and the outer ends of the spring arms may movably engage abutments on a flange or part which is fast on an airscrew shaft or hub and rotatable through a small angle on or in the end of the crankshaft. Alternatively, the abutments may be located inside the airscrew blades. Alternatively, the spring arms may radiate from one of their ends from a boss or part fast on an airscrew shaft or hub mounted so as to be rotatable through a small angle in or on the end of a crankshaft, and the outer or other ends of the spring arms may movably engage abutments on a flange or part on the crankshaft. The damping means may comprise two members, one fast on the boss, flange or part on the crankshaft, and the other fast on the flange, boss or part on the airscrew shaft or hub.

The friction damper members may have the form of annular rings or truncated cones or spheres, and brake-lining or the like friction material may be inserted between the members. The airscrew shaft or hub may be arranged to have sufficient axial or end float to allow the airscrew thrust to be communicated from one friction damper member to the other through the friction material and thereby to set up a friction torque opposing relative angular movement of the members which accompanies spring deflection of the spring arms, whether the deflection is in the forward or in the reverse direction.

The magnitude of the slipping torque is:—

$$\frac{fTR}{\sin a}$$

where:—$T$ is the thrust; $R$ is the radius of action of the friction; $f$ is the friction coefficient; and $a$ is the half cone angle.

The slipping torque should be preferably not less than $$\frac{\pi}{4}$$

times the amplitude of the principal harmonic of the torque transmitted, at corresponding resonance speed, when the ratio of this amplitude to the corresponding thrust is a maximum. In allowing a moderate margin above this value specified, a large damping effect is obtained and at the same time the rate of dissipation of energy in the damper remains small. The area of friction material provided is decided by the enduring qualities of available material having the desired friction coefficient.

With effective damping the spring stresses are much lower and it is possible to reduce the volume of spring material without loading the material unduly. It appears possible to use liner bearings for the airscrew hub of a material such as ferrobestos, and that there is no need to provide for taking thrust at the front bearing as it is taken by the damper. For some applications it may be desirable to make the damper double-acting i. e. to work with thrust acting either way.

In another arrangement, one friction damper may be mounted as a flange or part formed with a peripheral V-shaped groove or other internal surface, in or against which a number of segmental friction blocks bear. These friction blocks are guided radially and kept in contact with the groove or other surface by means of radially arranged spiral springs. The flange or part, at its periphery, engages the outer ends of the spring arms. With this arrangement rotation of the coupling increases the outward load on the friction blocks by centrifugal action.

In lieu of employing a dry friction damper, a viscous friction damper may be employed consisting of a number of annular friction plates, of which the odd numbers are made fast at their outer periphery to a flange or part, which is fast on the driving or driven member and engages the outer ends of the spring arms. The even numbers of the plates are made fast at their inner periphery to a flange, which is fast to the boss or part from which the spring arms radiate. In this construction, oil or the like may be introduced between the friction plates, or the plates may work in oil.

In an alternative arrangement, the damping action is obtained by hydraulic means. For example, spring arms, in the form of blades radiate from a central boss or part and engage peripheral parts fast to the driving or driven member, and the spring arms are arranged to work in chambers charged with liquid so as to produce a damping action by movement of the arms in the chambers.

The blade form of the spring arms may be employed in any of the constructions according to the present invention.

The blade form spring arms may be made tapering from their boss to the outer or free end in a plane at right angles to the axis of rotation, and narrower at their ends than at their intermediate parts in face view, i. e. when looked at from a direction at right angles to the axis of rotation.

The outer ends of the spring arms, particularly when the latter are in the form of blade springs, may engage diametrical slots formed in trunnion pins or gudgeon pins, which are mounted on the driving or driven parts parallel to the axis of rotation of the coupling. Rotary movement and axial slidable movement of the trunnions or gudgeon pins in their supports may be provided. Alternatively, the outer ends of the spring arms may engage in plain recesses in the driving or driven parts. Instead of trunnions or plain recesses, recesses of gear tooth form may be employed, and the outer ends of the spring arms may be shaped to tooth form, like the teeth of a pinion having its centre at a point in the arm that can be determined from the form of the arm, to minimize friction at the engaging parts.

The spring arms may be arranged so as to radiate outwards with their centre lines normal to the axis of rotation of the coupling, or may be arranged so that their centre lines radiate outwards in cone form. In this case bevel teeth may be used instead of pinion teeth, but trunnions or plain recesses might be used if desired.

In some cases, stops may be employed for limiting relative rotation of the coupling parts, such stops coming into operation under extreme or accidental conditions.

The connection of the free ends of the spring arms so as to permit of relative movement, for example sliding of the ends in the slots in the gudgeon pins, and rotary and axial movement of the gudgeon pins in their supports, may accommodate mal-alignment of the coupled members. When the required accommodation is angular only and of small degree, it may be made by a slight sliding and twisting of the spring arms. When the required accommodation is transverse only and of small degree, it may be made by slight sliding and bending of the spring arms.

In some cases, thrust loading for the damper may be applied by a spring or springs.

Instead of the inner ends of the spring arms being fixed to a boss and the outer ends being free, the outer ends may be fixed together by a ring and the inner ends free and engaging abutments on the boss.

The damper spring coupling unit is not limited to the application to crankshaft-airscrew drives, and may be applied in other dynamic systems. Where more than one mode of vibration has to be damped, it may be advantageous to use more than one coupling unit.

The invention is applicable, inter alia, to the spring drives described in my British Patent specification No. 292,276.

Various constructions or arrangements of coupling according to the present invention are illustrated, by way of example, in the accompanying drawings, in which:—

Figure 1 is a general arrangement longitudinal section of one form of spring coupling unit with a solid friction damper;

Figure 2 is a longitudinal section of a detail;

Figure 3 is a part transverse section;

Figure 4 is a section on the line 4—4 in Figure 3;

Figure 5 is a general arrangement longitudinal section of another form of spring coupling unit with a solid friction damper;

Figure 6 is a longitudinal section of a detail;

Figure 7 is a part transverse section;

Figure 8 is a section on the line 8—8 in Figure 7;

Figure 9 is a section on the line 9—9 in Figure 7;

Figure 12 is a longitudinal section of a detail;

Figure 13 is a general arrangement longitudinal section of a form of spring coupling with a solid friction damper applied to a crankshaft airscrew drive;

Figure 14 is a transverse section of a detail;

Figure 15 is, as to the upper half, a general arrangement longitudinal section of another form of spring coupling with a solid friction damper applied to crankshaft-airscrew drive, and as to the lower half a longitudinal elevation;

Figure 16 is a part general arrangement longitudinal section of another form of spring coupling with a solid friction damper applied to a crankshaft-airscrew drive, the springs being arranged inside the blades of the airscrew;

Figure 17 is a part transverse section;

Figure 18 is a section on the line 18—18 in Figure 17;

Figure 19 is a part general arrangement longitudinal section of another form of spring coupling with a solid friction damper applied to a crankshaft-airscrew drive, the springs extending from inside to outside the airscrew hub;

Figure 20 is as to the left hand half a transverse section, and as to the right hand half an axial view;

Figure 21 is as to the left hand half a sectional plan, and as to the right hand half a plan.

Similar reference numerals indicate like parts wherever repeated in the drawings.

Figure 10:
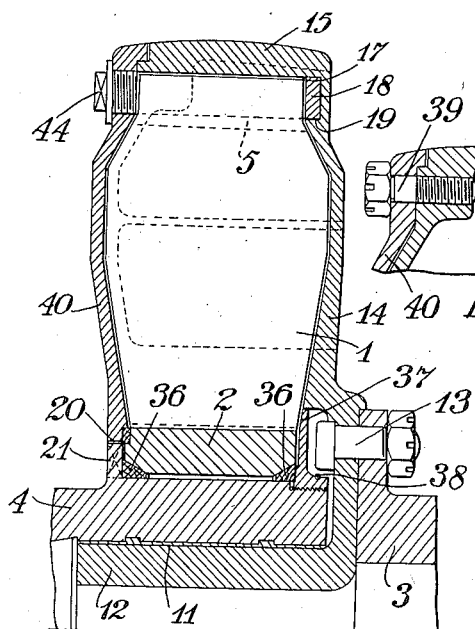
Figure 10 is a general arrangement longitudinal section of another form of spring coupling unit with a hydraulic damper.

In the arrangements shown in the drawings, the coupling unit comprises spring arms 1, which radiate from their inner ends from a boss 2, which is fast to the driving member 3 or the driven member 4, and have their outer or free ends arranged to take a bearing against abutments 5, which are fast on the driven member 4 or the driving member 3 respectively. The coupling further comprises a damping member 6, which is fast to the driving member 3 or the driven member 4, and a damping member 7, which is fast to the driven member 4 or the driving member 3 respectively.

Referring particularly to Figures 1 to 4, the boss 2 is made fast to the damping member 6 by means of screws 8; the damping member 6 is made fast to the driven member 4 by means of screws 9; and the boss 2 is rotatably mounted on roller bearings 11 on a tubular continuation 12 which is made fast to the driving member 3 by means of bolts and nuts 13.

The part 12 is formed with a flange 14, which is integral with an axially extending peripheral rim 15, which is made fast by means of bolts and nuts 16 to the damping member 7. The outer ends of the spring arms 1, which are in the form of blade springs, engage slots 17 in bifurcated trunnion pins 18, which are turnably mounted in bearings 19 in the rim 15. The spring arms 1 serve as driving arms between the members 3 and 4, and relative rotation between these members is limited by means of coacting dogs 20, 21 fast on the parts 12 and 6 respectively The part 6 is formed with spoke-like radial guides 22 of rectangular external cross section and of circular internal cross section. Segmental saddle shaped blocks 23 are guided on the radial guides 22 and are urged outwards towards the part 7 by means of helical springs 24, which are housed in recesses in the radial guides 22. The blocks 23 and the part 7 are formed with a V-shape, as at 25, 26, and the part 7 is lined with brake lining material or the like 27. An annular cover plate 28 is secured by means of screws 29 to the guides 22. The blocks 23 and the lined part 7 serve as damping means between the members 3 and 4.

In this form of construction, a slight axial movement between the part 4 and the part 3 can be accommodated between the parts 2 and 12, between the parts 21 and 20, between the parts 1 and 18, and between the parts 6 and 23. The parts 2 and 12 serve to maintain the parts 4 and 3 in axial alignment.

Referring particularly to Figures 5 to 9, an arrangement similar to that just described is shown, but the parts 11 and 12 are omitted; the parts 20 and 21 are fast on the parts 13 and 2 (instead of on the part 12 and 6); the cover plate 28 is secured by the bolts and nuts 16 to the rim 15 (instead of by the screws 29 to the guides 22); and the guides 22 are of circular external cross section (instead of rectangular cross section).

Further, the damping member 7 (instead of being made fast to the rim 15) is connected through an Oldham or the like coupling member 30 to the rim 15.

The coupling member 30 is in the form of a ring having inward projections 31 and outward projections 32 located at right angles to one another. The inward projections engage transverse grooves 33 in the outer periphery of the part 7, and the outward projections engage transverse grooves in the inner periphery of the part 15. The side faces 34 on each projection are formed parallel to one another, whereby the projections can move and are guided radially and axially in the grooves 33.

Brake lining blocks 35 are arranged between the parts 22 and 23.

In this form of construction, a slight axial movement between the part 4 and the part 3 can be accommodated between the parts 21 and 20, between the parts 1 and 18, and between the parts 35 and 23. The parts 4 and 3 may be maintained as near as practicable in axial alignment by being mounted in suitable journal bearings or the like, and slight transverse inaccuracy in such axial alignment can be accommodated between the parts 7, 30 and 15. Slight angular inaccuracy is accommodated by sliding and twisting of the blades and by relative movement of the parts 22, 35 and 23.

Figure 11:
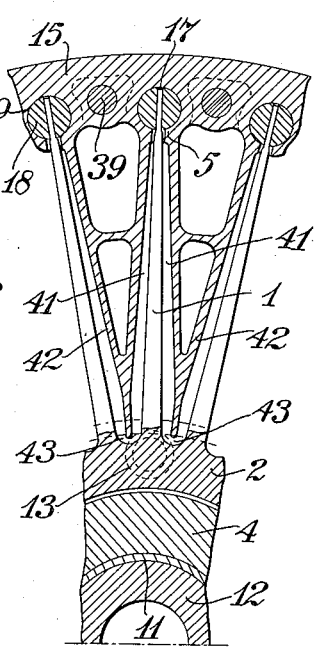
Figure 11 is a part transverse sectcion.

Referring particularly to Figures 10 to 12, the boss 2, from which the spring arms radiate, is made fast to the driven member 4 by means of keys or serrations, wedge rings 36, a locking nut ring 37 and a fixing circlip 38. The driven member 4 is axially aligned with the driving member 3 by means of a plain or white metal bearing 11 between the part 4 and a continuation 12, which is made fast to the part 3 by means of bolts and nuts 13.

The part 12 is formed with a flange 14, which is integral with a rim 15, which is made fast by means of bolts 39 to an annular flange 40, and relative rotation between the parts 4 and 3 is limited by means of coacting dogs 21 and 20 on the parts 4 and 40.

The spring arms 1 are enclosed between the flanges 14 and 40 and between the boss 2 and the rim 15, and the edges of the spring arms, which are in the form of blade springs, fit against the said flanges. In this construction the spring arms divide the annular space between these two flanges into a number of sectoral chambers 41. The outer ends of the spring arms engage trunnion pins 18, which are turnably mounted in the rim 15. Extending radially inwards from the rim 15 are a number of wedge shaped or the like rigid projections 42. These projections lie one between each adjacent two of the spring arms. Thus the sectoral chambers formed between adjacent spring arms are subdivided in a plane containing the axis of rotation of the coupling, by the projections. These projections do not, however, entirely separate the two parts of the sectoral chambers, but leave a communicating constriction 43 between the two parts of each chamber. With this construction relative movement can take place, owing to deflection of the spring arms, between the spring arms and the projections, whereby oil or other fluid introduced into the sectoral chambers through a charging inlet 44 may be caused to be forced to or fro in the plane of rotation from one part of a sectoral chamber to the other part, thereby producing a suitable damping action.

Referring particularly to Figures 13 and 14, the boss 2, from which the spring arms 1 radiate, is made fast to the damping member 6, which is in the form of a conical ring, by means of screws 8. The boss 2 is made fast to the driving member 3, which in this example represents the rotary crankshaft of an aero engine, by means of splines 45, a wedge ring 46, and a screwed sleeve 47. The driven member 4, which in this example represents the hub of a wooden airscrew, is made fast to the rim 15 and to the damping member 7, which consists of fore and aft conical rings which are secured to the rim 15 by means of bolts and nuts 16. The rings 7 lie on each side of the ring 6 with brake lining material secured on the inner face of the rings 7. The arms 1 engage trunnion pins 18 in the rim 15.

The airscrew hub 4 is mounted on anti-friction bearings 48 which are mounted on extensions 49, 50 on the boss 2. The extension 50 is connected to the extension 49 by screw threads 51, and is locked to the sleeve 47 at 52. 53 and 54 are guard plates for the bearings. One flange of the hub 4 is adjustable for clamping the airscrew by means of bolts 55. Relative rotation between the parts 4 and 3 is limited by dogs 21 and 20 on the parts 7 and 6.

In this construction slight axial movement of the bearings 48 relative to the boss 2 can be accommodated by compression of the lining material 27 between the rings 6 and 7 in the direction of thrust, and the damping action is affected by the speed of rotation of the airscrew.

Referring particularly to Figure 15, the boss 2, from which the spring arms 1 radiate, is made fast to the damping member 6, at 56, and the crankshaft 3 of an aero engine at 45. The driven member 4, which in this example represents an airscrew shaft, for carrying a metal or wooden airscrew 57 fast on it, is made fast to the rim 15 and to the damping member 7, which consists of a single conical ring secured to the rim 15 by means of bolts and nuts 16. The airscrew shaft is mounted on anti-friction bearings 48 inside the crankshaft. The driven member 4 at the part where the airscrew hub fits on may be made the same shape as the part of the crankshaft shown in Figure 13 to enable a standard airscrew to be fitted. 57$^x$ is a spinner carried by the bolts 16.

The boss 2 is also made fast to a dished spring plate 57, at 58, the boss and the plate being located axially on the crankshaft by means of a flanged nut 59. The part 57 carries a brake lining pad 60, which bears against a flange on the part 4 integral with the rim 15. The arms 1 engage trunnion pins 18 in the rim 15. Relative rotation between the parts 4 and 3 is limited by means of dogs 21 and 20 on the parts 7 and 6.

In this construction slight axial movement of the bearings 48 relative to the crankshaft can be accommodated by compression of the lining material 27 between the rings 6 and 7 in the direction of thrust, which is aided by the spring plate 57, and the damping action is affected by the speed of rotation of the airscrew.

The trunnion pins may be submerged in grease or oil held out by centrifugal action while the coupling is rotating. Drain holes, such as 7$^x$ in Figure 15, are provided for preventing the material 27 from being submerged in lubricant. Alternatively the trunnion pins may be made of brake lining material.

Referring particularly to Figures 16 to 18, the boss 2 is made fast to the damping member 6, at 56, and to the crankshaft 3 of an aero engine at 45. The driven member 4, which in this example represents an airscrew hub, is made integral with the damping member 7. The airscrew hub is mounted on anti-friction bearings 48 on the boss 2.

The spring arms 1 are located inside the hollow airscrew blades 61 (which are shown at right angles to their normal angle of attack for convenience of draughtsmanship), and engage the flat faces of approximately hemispherical parts 18, which take a bearing against the walls of the airscrew blade which serve as abutments. The parts 18 may be located with the aid of a cross pin 62.

The damping members 6 and 7 are made of arcuate form, and the airscrew hub 4 is made in half parts secured together by means of bolts and nuts 63.

Relative rotation between the parts 4 and 3 is limited by contact between the spring arm 1 and the walls of the airscrew blade.

In this construction slight axial movement of the hub 4 relative to the boss 2 can be accommodated by compression of the lining material 27 between the parts 6 and 7 in the direction of thrust, and the damping action is affected by the speed of rotation of the airscrew. 64 is a brake lining washer between the damping member 6 and the cranks of the aero engine.

Referring particularly to Figures 19 and 21, the boss 2 is made fast to the damping member 6, at 56, and to the crankshaft 3 to an aero engine at 45. The driven member 4 which in this example represents an airscrew hub adapted for metal airscrew blades is made integral with the damping member 7. The damping members 6, 7 are spherical about the centre point of the airscrew hub, and the hub is mounted on spherical bearings 48 on the boss 2, which may be brake lining material, the damping members 6, 7 are made of arcuate form.

The spring arms 1 extend from the boss 2 inside the hub, through openings 65 to outside the hub, where they become broader and thinner, and engage trunnion pins 18 in bearings 19 in two opposite parts of a four-part ring 66, which is located in a groove around the hub, which is made in half parts.

Said two opposite parts of the rings 66 are formed with bolts 63, which engage bolt holes in the two other opposite parts of the ring, and the four parts of the ring are secured together by means of nuts on the bolts. The ring thus serves to secure together the half parts of the hub.

67 are grease retaining nipples for receiving grease guns.

Relative rotation between the parts 4 and 3 is limited by contact between the arms 1 and the edges of the openings 65.

In this construction slight axial movement of the hub 4 relative to the boss 2 can be accommodated by compression of the lining material 27 between the parts 6 and 7 in the direction of thrust, and the damping action is affected by the speed of rotation of the airscrew.

In a hub arranged for metal airscrews, with either hollow or solid metal blades, the trunnions may be incorporated in the strap or housed in separate lugs. The damper lip is preferably integral with a half socket and preferably of spherical form to facilitate machining and assembly of the inner damper member. Four separate spring arms, for example, may be arranged to give the same flexibility and stress as the twenty arm arrangement. The saucer shaped damper is preferably cut away at the sides in order to give a neat arrangement, and it will be noted that introduction of the spring drive and damper does not interfere with the adjustment of blade pitch.

Figure 22:
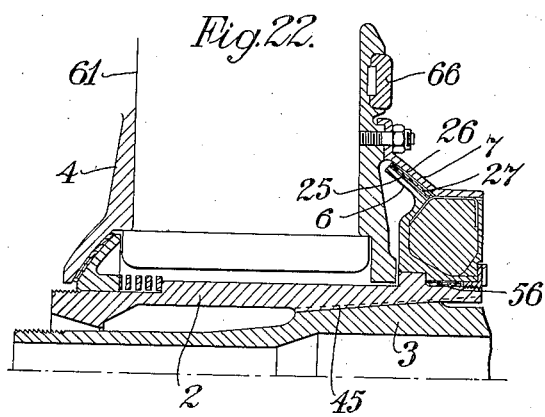
Figure 22 is a sectional view of the upper half of an airscrew hub and portion of the crankshaft showing damping members adapted to restrict transverse, as well as torsional, vibrations.

A further development is shown in Figure 22. Here, the front bearing is a spherical steady and the rear bearing is a ring of resilient material to allow slight movements of the airscrew in planes passing through the axis of rotation of the shaft. The damper, being spherical, damps out such movements and thereby relieves the shaft and aircraft of corresponding transverse vibrations, the arrangement being a complement of mounting the engine on rubber buffers—with the addition the definite damping is provided. The spring on the front spherical bearing is to overcome negative thrust when "windmilling", and take up wear. It will be noted that the airscrew is kept truly centred on the shaft. The damper members in this case are complete rings.

The invention is not limited to the particular forms of construction described and it will be obvious that modifications can be made without departing from the scope of the invention. In some of the constructions shown, the shaft 3 may be a shaft gear-driven from a crankshaft, for example in Figures 13 to 21.

I claim:

1. A coupling for conveying rotary motion comprising a plurality of spring arms for transmitting the drive, extending between the driving and driven members, in combination with damping means for opposing relative oscillations of said members comprising a plurality of friction surfaces, at least one being associated with the driving member, and at least one being associated with the driven member, said friction surfaces being arranged so that axial forces holding them being in contact provide a radial force component between the coacting surfaces.

2. A coupling according to claim 1 wherein said friction surfaces are associated with the engine and airscrew shafts of aircraft, and are adapted to be held together by axial thrust forces transmitted by the airscrew.

3. A coupling for conveying rotary motion comprising a plurality of spring arms for transmitting the drive, extending between the driving and driven members, in combination with damping means for opposing relative oscillations of said members comprising coacting friction surfaces, one associated with the driving member and another with the driven member, and means for holding said surfaces together, the forces provided by said means being of substantially the same value for all relative rotational positions of the coupled members.

4. A coupling for conveying rotary motion comprising a hub adapted to be secured to one of the driving and driven members, a plurality of spring arms, integral with said hub, extending to the other of said driving and driven members and movably engaging abutments thereon in combination with damping means for opposing relative oscillations of said members comprising coacting friction surfaces, one associated with the driving member and another with the driven member, and means for holding said surfaces together, the forces provided by said means being of substantially the same value for all relative rotational positions of the coupled members.

5. A coupling for conveying rotary motion comprising a plurality of spring arms for transmitting the drive, extending between the driving and driven members, in combination with damping means for opposing relative oscillations of said members comprising a plurality of friction surfaces inclined to the rotational axis, at least one being associated with the driving member, and at least one being associated with the driven member, said friction surfaces being adapted to be held in contact with one another, and thereby providing said damping by means, the forces from which are of substantially the same value for all relative rotational positions of the coupled members.

6. A coupling for conveying rotary motion comprising a plurality of spring arms for transmitting the drive, extending between the driving and driven members and each being firmly secured at one end to one of said members, and at its other end movably engaging abutments on the other of said members, in combination with a friction damper comprising friction blocks guided radially, and urged by springs in a radial direction against coacting friction surfaces, the engaging surfaces of said friction blocks and the coacting surfaces being inclined to the rotational axis of the coupled members, and said springs being adapted to impose forces of substantially the same value for all relative rotational positions of the coupled members.

7. A coupling for conveying rotary motion comprising a plurality of spring arms for transmitting the drive, extending between the driving and driven members and each being firmly secured at one end to one of said members, and at its other end movably engaging abutments on the other of said members, in combination with a friction damper comprising coacting conical friction surfaces in alignment with the rotational axis of the coupled members, one conical surface being associated with the driving, and one with the driven, members, and means for holding said surface together, the forces provided by said means being of substantially the same value for all relative rotational positions of the coupled members.

8. A coupling for conveying rotary motion comprising a plurality of spring arms for transmitting the drive, extending between the driving and driven members, in combination with damping means for opposing relative oscillations of said members comprising coacting friction surfaces, one associated with the driving member and another with the driven member, said damping means and said driving arms being located in different planes in order to avoid oiling of the friction surfaces by lubricant from the arms and adjacent parts.

9. A coupling according to claim 3 comprising spring loaded coacting friction surfaces.

10. A coupling for conveying rotary motion comprising a plurality of spring arms for transmitting the drive, extending between the driving and driven members in combination with damping means for opposing relative oscillations of said members comprising coacting friction surfaces which are located between the driving and driven members and converge towards the rotational axis, and are pressed together by thrust forces along the rotational axis.

BENJAMIN CHARLES CARTER.